(12) United States Patent
Ogoniek et al.

(10) Patent No.: US 6,412,879 B1
(45) Date of Patent: Jul. 2, 2002

(54) COMPOSITE SPRING SEAT FOR AN AXLE HOUSING

(75) Inventors: Ron J. Ogoniek; Mark A. Tourigny, both of Barrie (CA)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/437,747

(22) Filed: Nov. 10, 1999

(51) Int. Cl.$^7$ ............................................... B60B 35/00
(52) U.S. Cl. ...................................... 301/125; 301/137
(58) Field of Search ............................ 301/124.1, 125, 301/137, 65, 64.7; 74/606, 607

(56) References Cited

U.S. PATENT DOCUMENTS

| | | | |
|---|---|---|---|
| 1,872,394 A | | 8/1932 | Bleicher |
| 2,124,406 A | | 7/1938 | Spatta |
| 2,204,287 A | * | 6/1940 | Wilber .................... 301/124.1 |
| 2,273,336 A | | 2/1942 | Spatta |
| 2,368,695 A | * | 2/1945 | Wilber .................... 301/124.1 |
| 2,611,656 A | | 9/1952 | Vanderberg |
| 3,037,818 A | | 6/1962 | Scheel |
| 3,804,467 A | * | 4/1974 | Austermann ............ 301/124.1 |
| 3,817,550 A | | 6/1974 | Young |
| 3,913,937 A | | 10/1975 | Longworth et al. |
| 4,234,120 A | | 11/1980 | Pringle |
| 4,322,061 A | | 3/1982 | Masser |
| 4,363,521 A | * | 12/1982 | Bonniwell et al. ............. 301/65 |
| 4,684,110 A | | 8/1987 | Sale et al. |
| 4,771,989 A | * | 9/1988 | Smith ......................... 267/249 |
| 4,793,597 A | * | 12/1988 | Smith ......................... 267/288 |
| 4,801,129 A | | 1/1989 | Wells |
| 4,969,634 A | | 11/1990 | Bellingham |
| 5,303,985 A | * | 4/1994 | Barnholt et al. .......... 301/124.1 |
| 5,360,261 A | * | 11/1994 | Archibald et al. ............. 301/65 |
| 5,421,642 A | * | 6/1995 | Archibald ..................... 301/65 |
| 5,429,423 A | * | 7/1995 | Pollock et al. ........... 301/124.1 |
| 5,454,585 A | * | 10/1995 | Dronen et al. ............... 267/220 |
| 5,467,970 A | | 11/1995 | Ratu et al. |
| 5,467,971 A | * | 11/1995 | Hurtubise et al. ........... 267/220 |
| 6,032,967 A | * | 3/2000 | Ogoniek ....................... 74/607 |

* cited by examiner

*Primary Examiner*—S. Joseph Morano
*Assistant Examiner*—Long Bao Nguyen
(74) *Attorney, Agent, or Firm*—Liniak, Berenato, Longacre & White

(57) ABSTRACT

A structure for a housing for an axle assembly and method for manufacturing same is disclosed. The composite spring seat has the following considerations; heat resistance (i.e., heat deflection temperatures in excess of about 500° F. and arc resistance in excess of 180° F.); high tensile and flexural strength properties in a broad temperature range (i.e., 41 ksi and 82 ksi respectively at 23° C.); and good impact properties (i.e., 41 ft/lb). The composite spring seat provides reduced weight (i.e. 15 lbs. to 6 lbs.), roughly half the manufacturing costs associated with the convention steel forging, and reduced noise transmitted by the composite material.

11 Claims, 6 Drawing Sheets

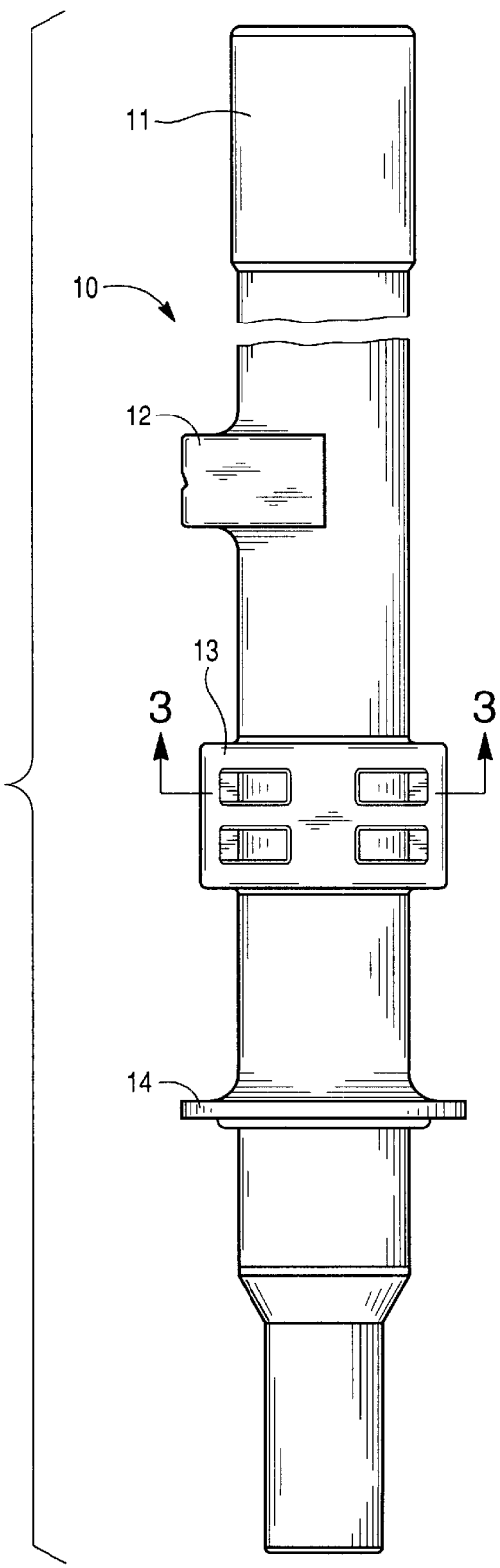
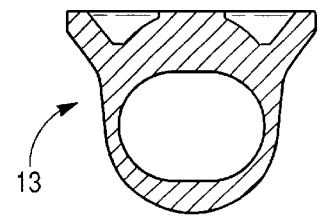
Fig. 2 Prior Art
Fig. 3 Prior Art

COMPOSITE SPRING SEAT FOR AN AXLE HOUSING

BACKGROUND INVENTION a) Field of the Invention

This invention relates in general to vehicle axle assemblies and in particular to an improved structure for a spring seat and housing for such an axle assembly and a method for manufacturing same.

b) Description of Related Art

Axle assemblies are well known structures, which are in common use in most vehicles. Such axle assemblies include a number of rotatable components that transmit rotational power from an engine of the vehicle to the wheels thereof. These rotatable components are usually enclosed in protective non-rotatable housing. The housing typically includes a central carrier (which rotatably supports a differential mechanism therein) having a pair of outwardly extending tubes (which enclose the axle shafts extending from the differential to the wheels of the vehicle). In the past, the tubes have been formed from sections of hollow cylindrical steel tubes which have been welded, bolted, or otherwise secured to the carrier to form the axle housing.

The tubes of these axle housings are frequently provided with one or more additional components for various purposes. For example, it is generally desirable to provide a circumferentially extending flange about the tube near the outer end thereof to function as a mounting surface for the components of the brake for that wheel. Also, a seat is commonly provided on the tube for securing a plurality of leaf springs or similar means for resiliently connecting the frame of the vehicle to the axle housing. Lastly, it is known to provide a pad on the tube to which a bracket is welded for securing a shock absorber or similar means for dampening oscillations of the frame of the vehicle relative to the axle housing. In the past, the brake flange, the spring seat, and the shock absorber pad have all been formed from individual components which were welded, bolted, or otherwise secured to the tubes.

Conventionally, a spring seat is secured on each tube by welding. Such spring seats comprises a plate with side sections that bent at least partially around the central portion of the axle. The leg portions of each spring seat are welded to the axle tube. FIG. 1 illustrates a conventional spring seat 6 secured to an axle tube 4 by welding. A top plate 9 and leaf spring 5 are clamped to the assembly of the axle tube 4 and spring seat 6 by U-bolts 3 which pass through registering holes in the spring seat 6 and top plate 9 and are secured by washers and nuts (not shown).

It has also been found desirable to form the axle housing integrally by casting molten metal into an appropriately shaped mold. Thus, it is known to form the carrier and tubes of the axle housing from a single piece of material cast into a predetermined shape. Furthermore, it has also been found desirable to form the additional components of the axle housing (i.e., the brake flange, the spring seat, and the shock absorber pad) integrally with the tubes by casting.

FIGS. 2 and 3 illustrate a tube 10 provided with an inner end that is adapted to be secured to a carrier (not shown) of the axle housing. Additionally the tube 10 is provided with a shock absorber pad 12, a spring seat 13 and a brake flange 14, the functions of which are well known in the art. For this known axle tube, each component 10–14 is formed by casting so that these components are integrally formed as part of the tube 10.

It can be seen that known axle housing castings are inefficient because they are composed of more material than is required to accomplish the intended function. The inclusion of the additional steel material in the known axle housing forging results in unnecessary material cost and increased weight. Since cost and weight are prime considerations in the design of axle housings and other vehicle components, it would be desirable to provide an improved axle housing which meets its intended functional requirements without adding unnecessary cost or weight thereto.

SUMMARY OF THE INVENTION

This invention relates to an improved structure for an axle assembly housing and spring seat, as well as a method for manufacturing same. The housing includes a tube which is formed by casting or other appropriate methods, and the tube is provided with a brake flange, a spring seat, a shock absorber pad, and an outer end for mounting wheel bearings. In accordance with this invention, the spring seat is formed from a composite material and this composite spring seat provides a direct replacement for the current production steel forging.

The design advantages of the composite spring seat of this invention include reduced weight (i.e. 15 lbs. to 6 lbs.), roughly half the manufacturing costs associated with the convention steel forging, and reduced noise transmitivity of the composite material.

As with the steel forged spring seat, the composite spring seat is welded to the axle housing and delivered as a packaged assembly to the customer. As a result, the material selection for the composite spring seat has the following considerations; heat resistance (i.e., heat deflection temperatures in excess of about 500° F. and arc resistance in excess of 180° F.); high tensile and flexural strength properties in a broad temperature range (i.e., 41 ksi and 82 ksi respectively at 23° C.); and good impact properties (i.e., 41 ft/lb). Consequently, the best material currently envisioned by the inventors is Varimat® 156-044 SMC molding compound, 60% glass, 2" chop with continuous strands, longitudinally placed at ⅜".

The composite part is preferably processed in a vertical press in a 4-cavity compression mold. To facilitate the welding process, there is preferably an in-mold steel insert within the composite structure. This insert is preferable placed in each cavity within the mold prior to the SMC material. The material is a thermoset material, therefore, the mold is heated, and the die is then closed deforming the material into the desired shape. While the die is in the closed position, a dwell time is required to cure the material. The die is then opened and the part is removed.

Various objects and advantages of this invention will become apparent to those skilled in the art from the following detailed description of the preferred embodiments, when read in light of the accompanying drawing.

BRIEF DESCRIPTION OF THE DRAWINGS

FIG. 2 is a top plan view of a rough casting for a tube adapted for use in an axle housing in accordance with a convention axle housing design.

FIG. 3 is a sectional elevational view of the tube taken along line 3—3 of FIG. 2.

DETAILED DESCRIPTION OF THE PREFERRED EMBODIMENTS

Figure 1:
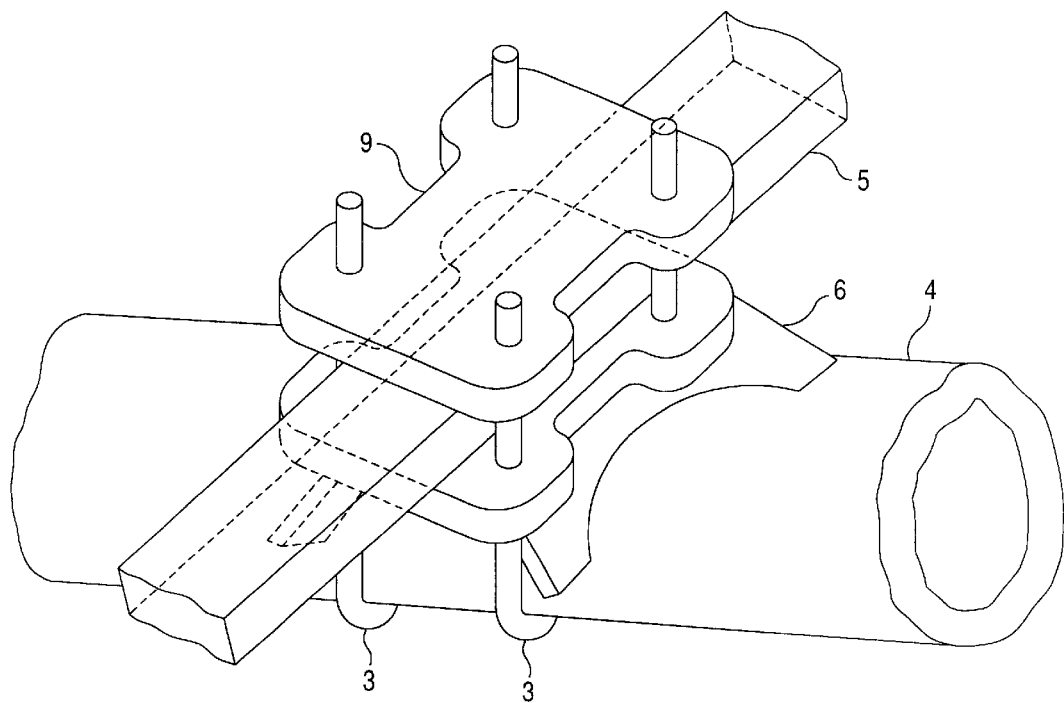
FIG. 1 is a perspective view of a showing an axle beam in assembled relationship with an axle tube, spring and spring.
Figure 4:
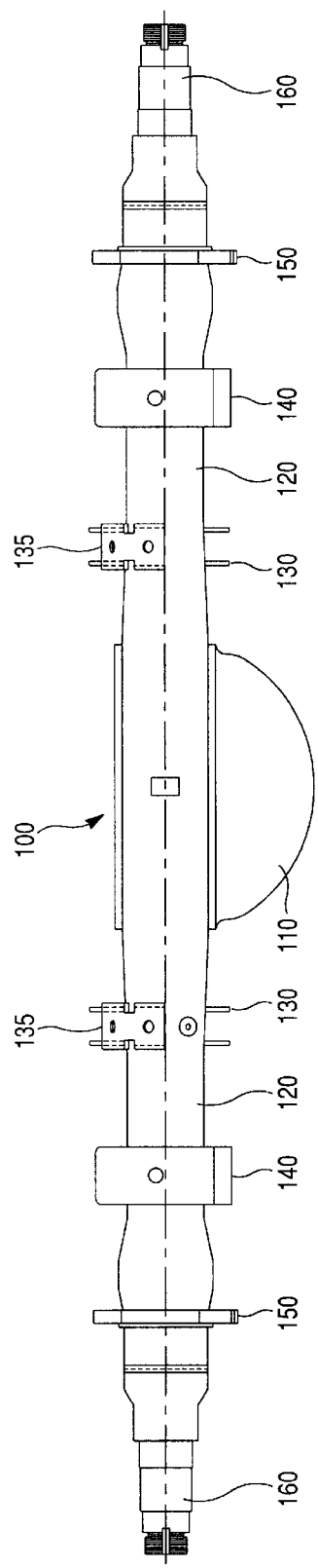
FIG. 4 is a top view of the housing assembly incorporating the composite spring seat.
Figure 5:
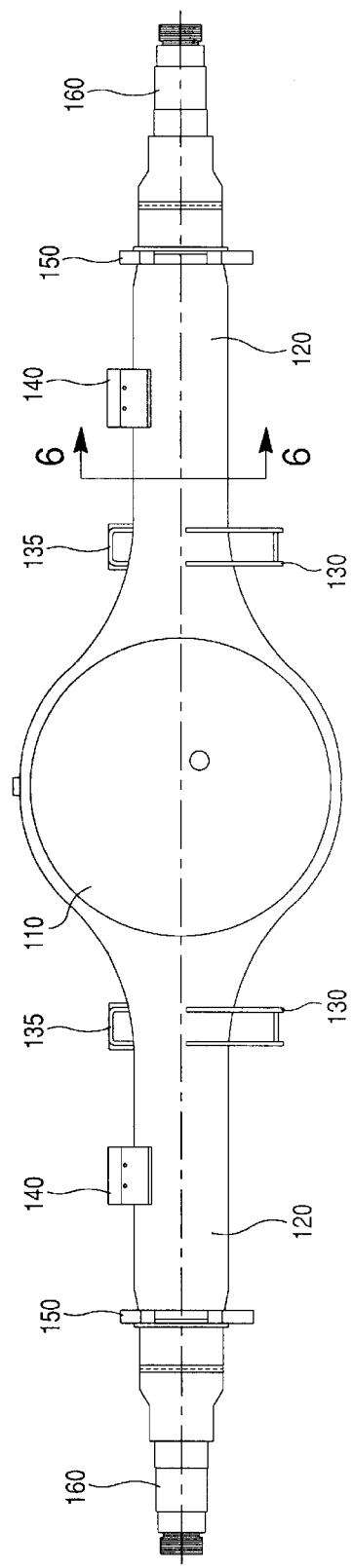
FIG. 5 is a rear view of the housing assembly of FIG. 4.
Figure 6A:
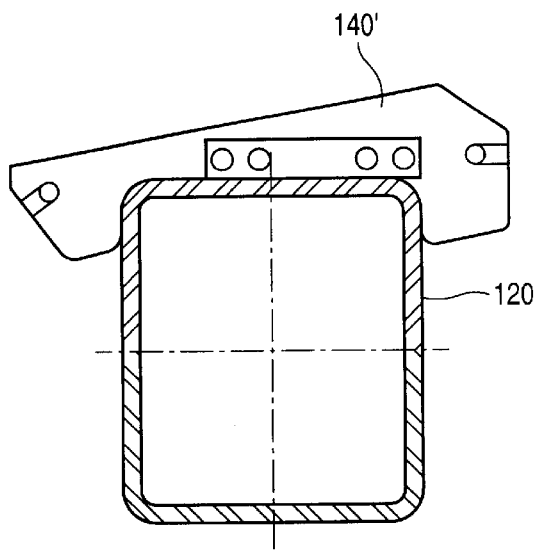
FIG. 6a is a sectional elevational view of the tube and a composite spring seat taken along line 6—6 of FIG. 5.
Figure 6B:
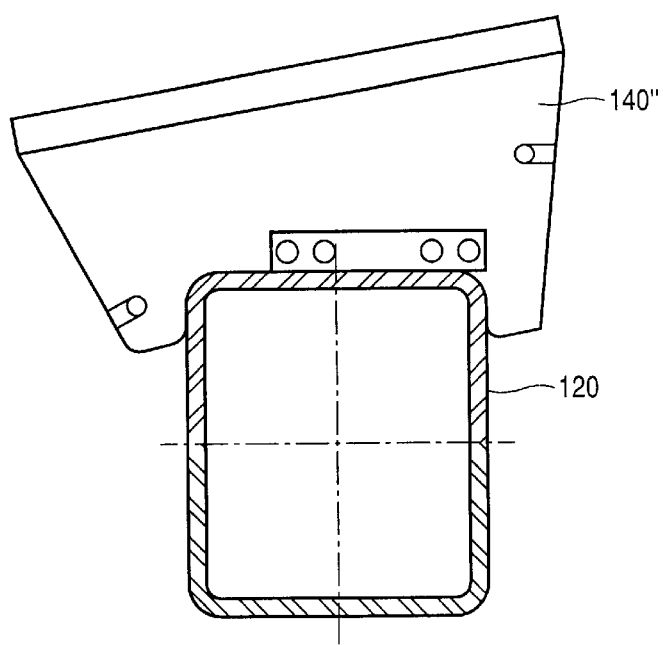
FIG. 6b is a sectional elevational view of a tube and composite spring seat similar to FIG. 6a but with a different design of the composite spring seat.
Figure 7:
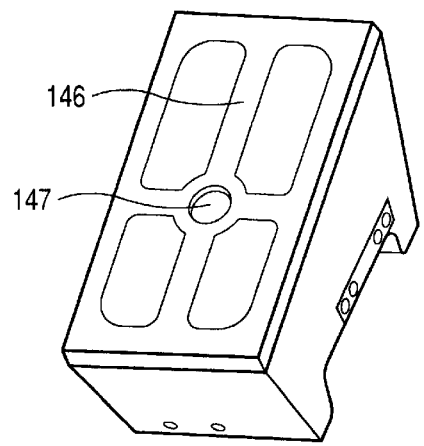
FIG. 7 is a top and tight side perspective view of the composite spring seat forming the preferred embodiment of this invention.
Figure 8:
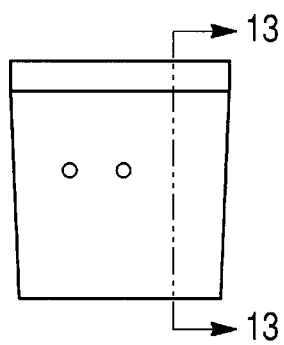
FIG. 8 is a front view of the composites spring seat of FIG. 7.
Figure 13:
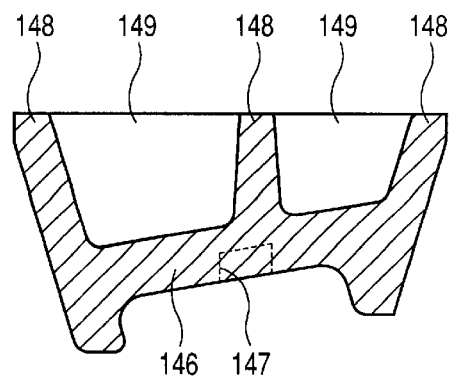
FIG. 13 is a sectional view of the composite spring seat of FIG. 7 taken along line 13—13 of FIG. 7.
Figure 10:
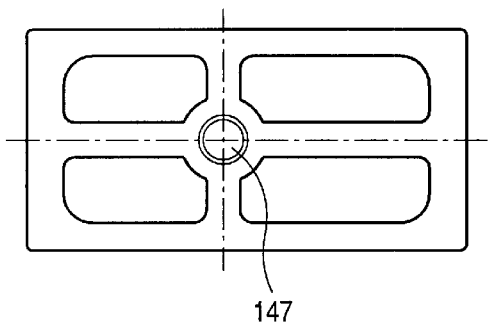
FIG. 10 is a top view of the composite spring seat of FIG. 7.
Figure 9:
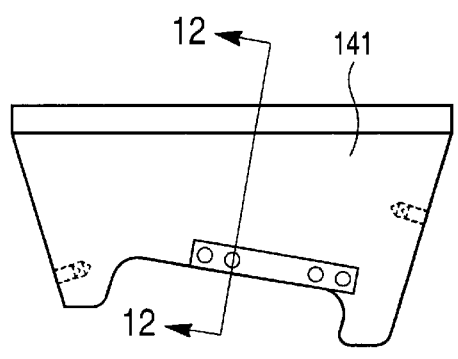
FIG. 9 is a right side view of the composite spring seat of FIG. 7.
Figure 12:
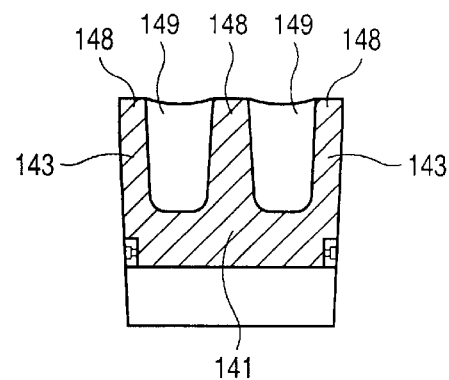
FIG. 12 is a sectional view of the composite spring seat of FIG. 9 taken along line 12—12 of FIG. 9.
Figure 11:
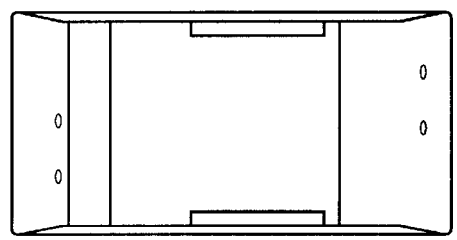
FIG. 11 is a bottom view of the composite spring seat of FIG. 7.

Referring now to the drawings, there is illustrated in FIGS. 4 through 6 an improved axle assembly, indicated generally at 100, adapted for use as part of a housing for a vehicle axle assembly in accordance with this invention. The assembly 100 includes a cup-shaped center housing generally show at 110 which is connected with tubular members 120. The center housing 110 and tubular members 120 are used to enclose the differential gearing and shafting which drive the wheels of a vehicle, respectively. The tubular members 120 are provided with an inner end which are adapted to be secured (e.g., by welding or integral formation) to a carrier housing 110 of the axle housing. Additionally, the tubes 120 are provided with shock absorber pads 130, stabilizer brackets 135, spring seats 140, and a brake flange 150, the conventional functions of which are all well known in the art. Lastly, the tube 10 is provided with an outer end 160 which is adapted to have bearings (not shown) mounted thereon for rotatably supporting a wheel on the tube 120.

Referring to the drawings of the invention, the assembly 100 includes spring seat members generally indicated at 140 secured to the intermediate portion of the tubular members 120. The spring seat members 140 serve to support springs which connect the axle housing assembly 100 to the frame of a vehicle (not shown). As best seen in FIGS. 7 through 13, the spring seat members 140 are comprised of a main body portion 146 which has a spaced relationship to the intermediate portion of the axle tube 120. The main body portion 146 has a central opening 147 for providing attachment to the springs connecting the axle assembly to the vehicle frame. Additionally, mounds 148 and cavities 149 on each side of the middle portion extend to contact the tubular member 120. An edged portion 142 extends from the plate main body 146 and legs 143 project downwardly therefrom and are disposed about the tubular housing member 120 to contact areas on the tubular members 120. The spring seat members 140 are welded to the tubular members 120 at these contact areas.

In accordance with this invention, the spring seats 140 are formed from a composite material, and this composite spring seat provides a direct replacement for the current production steel forging. The design advantages of the composite spring seat of this invention include reduced weight (i.e. 15 lbs. to 6 lbs.), roughly half the manufacturing costs associated with the convention steel forging, and reduced noise transmitted by the composite material. As set forth in this invention, a composite material is a complex material, such as wood or fiber glass, in which two or more distinct, structurally complementary substances, especially metals, ceramics, glasses, and polymers, combine to produce structural or functional properties not present in any individual component.

As with the steel forged spring seat, the composite spring seat is welded to the axle housing and delivered as a packaged assembly to the customer. As a result, the material selection for the composite spring seat has the following considerations; heat resistance (i.e., heat deflection temperatures in excess of about 500° F. and arc resistance in excess of 180° F.); high tensile and flexural strength properties in a broad temperature range (i.e., 41 ksi and 82 ksi respectively at 23° C.); and good impact properties (i.e., 41 ft/lb). Consequently, the best material currently envisioned by the inventors is Varimat® 156-044 SMC molding compound, 60% glass, 2" chop with continuous strands, longitudinally placed at ⅜".

The composite part is preferably processed in a vertical press in a 4-cavity compression mold. To facilitate the welding process, there is preferably an in-mold steel insert within the composite structure. This insert is preferable placed in each cavity within the mold prior to placement of the SMC material. The material is a thermoset material, therefore, the mold is heated, and the die is then closed deforming the material into the desired shape. While the die is in the closed position, a dwell time is required to cure the material. The die is then opened and the part is removed.

The present invention provides a unique arrangement of a composite spring seat for an axle housing assembly. The spring seat formed of composite material provides reduced cost and weight while improving vibration dampening characteristics of the spring seat.

In accordance with the provisions of the patent statutes, the principle and mode of operation of this invention have been described and illustrated in its preferred embodiment. However, it must be understood that this invention may be practiced otherwise than as specifically explained and illustrated without departing from its spirit or scope.

What is claimed is:

1. An axle housing assembly comprising:
   a hollow tubular member for receiving an axle therein, and
   a composite spring seat formed of composite reinforced plastic material mounted on said tubular member, said spring seat formed to engage a spring connecting said tubular member to a frame of a vehicle,
   wherein said composite spring seat is welded to said tubular member.

2. The axle housing assembly of claim 1, wherein said composite spring seat comprises an in-mold steel insert for facilitating a welding process.

3. The axle housing assembly of claim 1, wherein said composite spring seat is formed with a material having a heat deflection temperature in excess of about 500° F.

4. The axle housing assembly of claim 1, wherein said composite spring seat is formed with a material having an arc resistance in excess of 180° F.

5. The axle housing assembly of claim 1, wherein said composite spring seat is formed with a material having a tensile property of about 41 ksi at 23° C.

6. The axle housing assembly of claim 1, wherein said composite spring seat is formed with a material having a flexural strength property of about 82 ksi at 23° C.

7. The axle housing assembly of claim 1, wherein said composite spring seat is formed with a material having an impact property of about 41 ft/lb.

8. The axle housing assembly of claim 1, wherein said composite spring seat comprises a main body portion from engaging a spring connected to said frame of said vehicle.

9. The axle housing assembly of claim 8, wherein said composite spring seat comprises an aperture centrally located on said main body portion for receiving a tab formed on said spring.

10. The axle housing assembly of claim 8, wherein said composite spring seat comprises a plurality of ribs extending from said main body portion, said series of ribs forming leg portions that contact said tubular member.

11. The axle housing assembly of claim 1, wherein said composite spring seat comprises a plurality of cavities disposed between said plurality of ribs.

* * * * *